June 26, 1934.    E. J. LEVY, NOW BY JUDICIAL CHANGE OF NAME E. L. MAYO    1,964,414
THERMOSTATIC VALVE
Filed Aug. 26, 1929
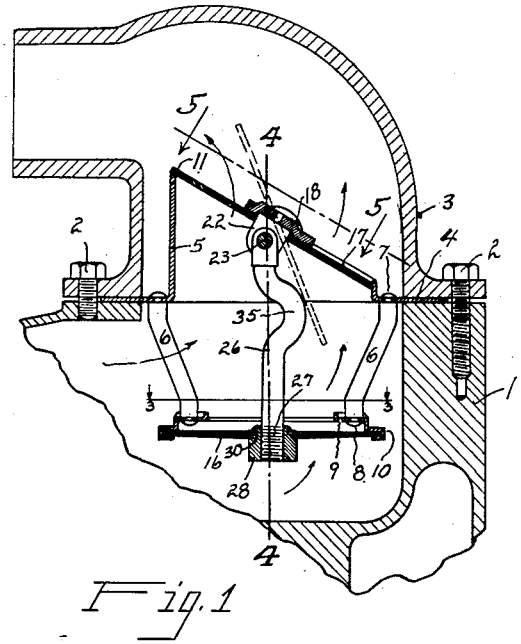
Fig.1
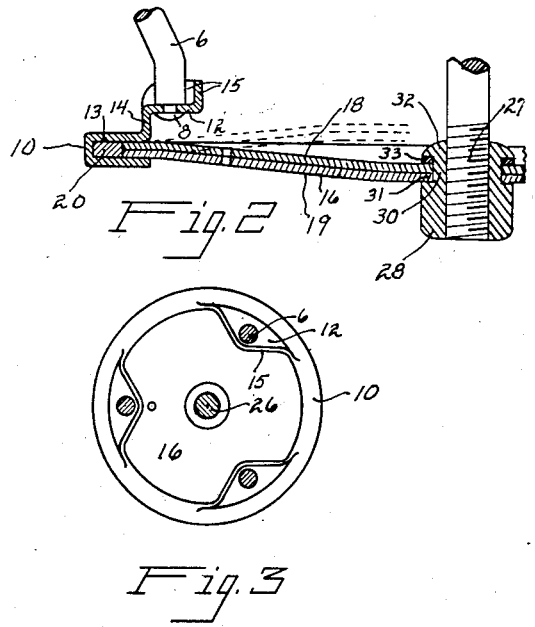
Fig.2
Fig.3
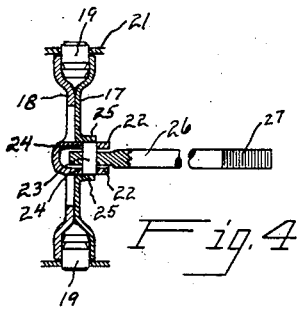
Fig.4
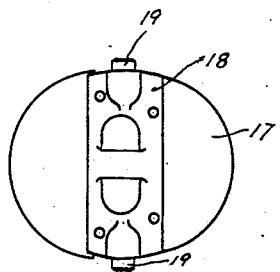
Fig.5
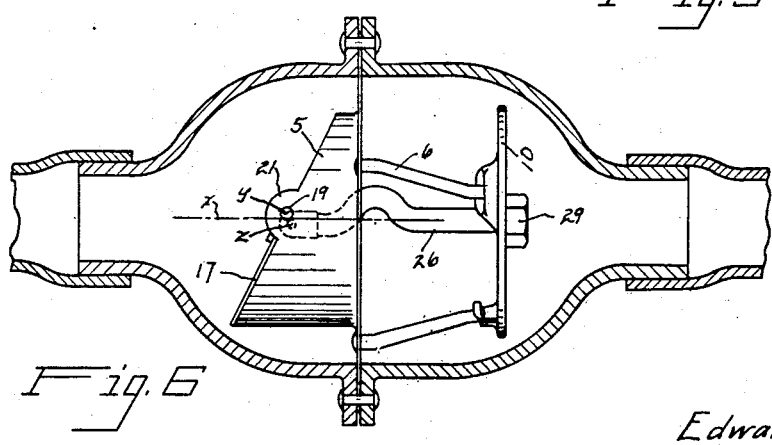
Fig.6
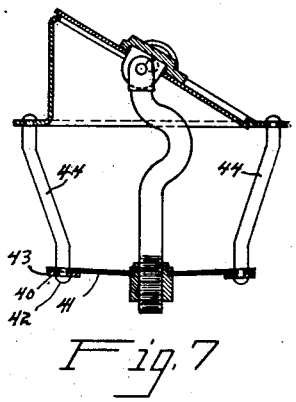
Fig.7
Inventor
Edward J. Levy
By Sloughs and Canfield
Attorney Patented June 26, 1934

1,964,414

UNITED STATES PATENT OFFICE 1,964,414

THERMOSTATIC VALVE

Edward J. Levy (now by judicial change of name Edward Levy Mayo), Cleveland, Ohio, assignor to The Bishop & Babcock Mfg. Co., Cleveland, Ohio, a corporation of Ohio Application August 26, 1929, Serial No. 388,308

19 Claims. (Cl. 236—34)

This invention relates to thermostatically operated devices for controlling the flow of fluids and more particularly relates to thermo-responsive valve devices for opening and closing fluid passages to regulate the flow of fluid therethrough.

One of the objects of my invention is to provide a thermo-responsive valve device having a valve adapted to be moved under the control of the thermostatic element responding to changes of temperature applied to the element.

Another object is to provide a valve device of the class described, in which the thermostatic valve controlling element may be of disk or diaphragm form and mounted, as for example, in a floating manner to insure its freedom and reliability of action.

Another object is to provide a valve device having a valve element adapted to be moved from the closed to the open position and vice versa in response jointly to the pressure and temperature conditions of the fluid to be controlled.

Another object is to provide a thermo-responsive valve device for controlling the flow of a fluid under pressure, having a valve element adapted to be opened by the pressure of the fluid and having a thermostatic element adapted to exert a valve closing force thereon and the resultant of the two forces on the valve varying in response to pressure and temperature conditions of the fluid to cause the valve to move with a gradual flow regulating movement.

Another object is to provide a thermo-responsive valve device adapted for controlling the flow of water in an internal combustion engine and its radiator responsive both to the temperature and pressure of the water, and, upon the stopping of the engine and the consequent cessation of the water pressure, adapted in response to temperature alone of the water to close and thereby stop further circulation of the water.

Another object is to provide a thermo-responsive valve device of the class described, which will be cheap to construct and simple to assemble and efficient and durable in operation.

Another object is to provide a thermo-responsive valve device adapted for installation in the line of water flow from an internal combustion engine to the radiator therefor in a simple and easily accessible manner.

Other objects will be apparent to those skilled in this art.

My invention is fully disclosed in the following description taken in connection with the accompanying drawing in which,—

Fig. 1 is a cross-sectional view of my improved valve device as it appears installed on the head of an internal combustion engine;

Fig. 2 is a fragmentary view of a part of Fig. 1, drawn to a larger scale and showing the mounting for a bi-metallic thermostatic element which I may employ;

Fig. 3 is a sectional view taken from the plane 3 of Fig. 1;

Fig. 4 is a view taken approximately from the plane 4 of Fig. 1 with some of the parts omitted;

Fig. 5 is a view taken from the plane 5 of Fig. 1 showing the valve proper which may be employed in my improved valve device;

Fig. 6 is a view showing my improved valve device in elevation and showing its installation in a water hose line as employed on internal combustion engines.

Fig. 7 is a view similar to Fig. 1 of a modified form of my invention.

In Fig. 1 at 1 is represented a part of the water jacket in the head of an internal combustion engine. Mounted upon the head and secured thereto by screws 2—2 is a hose connection head 3 on which a water hose connected to the engine radiator may be secured in a well known manner. Water may be caused to circulate through the engine head outwardly and into the hose connection head as indicated by the arrows.

By means of an annular flange 4 forming part of the frame of the valve device, the device, as a whole, is clamped and sealed on the engine between the engine head 1 and the hose connection head 3 by drawing up the screws 2. The working parts of the valve device are carried in a frame comprising the planular annular flange 4 referred to, shown in a horizontal position in Fig. 1 and formed integrally therewith is a short vertical cylindrical tubular valve seat portion 5, the upper end of which terminates in a plane at an angle to the vertical axis thereof and is therefore of generally elliptical contour. Depending from the flange 4 is a plurality, preferably three, of hangers 6 riveted into the flange 4 at their upper ends, as at 7, converging downwardly toward the vertical axis of the device and riveted at their lower ends at 8 into ears 9 on a diaphragm supporting ring 10.

The ring 10, preferably formed from a single piece of sheet metal is, in section on a vertical radial plane, of channel form; and the ears above referred to have horizontal portions 12 connected to one leg 13 of the said channel by vertical portions 14 and are reinforced by strengthening ribs 15. A circular diaphragm 16 made from bi-metallic metal (the two metals of which are indicated at 18 and 19) is supported in the channel form ring 10, it being formed to enclose the periphery of the diaphragm, preferably by the operation known as spinning.

Thus, the hangers 6 rigidly support the ring 10 co-axial with the tubular valve seat 5 and at a fixed pre-determined distance from the flange 4 and therefore from the valve seat 11, so that the position of the diaphragm 16, relative to the valve proper 17, to be described, is accurately determined and maintained.

In order to prevent the spinning operation from pinching or binding the peripheral edge of the diaphragm 16, an annular filler 20 is enclosed within the channel ring and by making it slightly thicker than the diaphragm 16, it will prevent the spinning operation from closing up the channel sufficiently to bind the diaphragm 16. The diaphragm 16 is thus held rigidly against movement in a vertical or axial direction, but may float slightly in the horizontal direction and to facilitate the floating movement, the external peripheral diameter of the diaphragm 16 may be slightly less than the internal diameter of the filler 20. The diaphragm 16 is dished to be concave on its upper side, at relatively low operating temperatures.

The valve proper 17 consists of an elliptical disk shown separately in Fig. 5. Upon the upper side of the disk is riveted or spot welded a transverse member 18. In the ends of the transverse member 18 and in the adjacent edges of the valve 17 pockets are pressed into which valve pivot trunnions 19 are secured. The trunnions extend through apertures in ears 21 rising from the upper termination of the tube 5 and the elliptical shaped valve 17 is thus mounted to oscillate on an axis parallel to its minor elliptical axis but spaced therefrom a small amount as will appear later.

The transverse member 18 is formed with bearing lugs 22 depending therefrom and passing through a suitable aperture approximately at the center of the valve 17, to provide a bearing support for a bearing pin 23 supported in perforations 24 in the lugs 22. Tongues 25 formed from and depending from the valve 17 lie adjacent to the lugs 22 and cover the perforations 24, thus, in a simple manner, trapping the pin 23 in the perforations 24.

The upper end of a connecting rod 26 lies between the lugs 22 and has a bearing on the pin 23 and depends therefrom generally axially, its lower end being threaded as at 27, which threads are screwed into a nut 28, rotatably secured at the center of the diaphragm 16. The nut 28 comprises a hexagonal or square head 29 and a body portion 30 of reduced diameter which in the construction of the device is inserted into a suitable perforation 31 in the diaphragm 16 and is spun over as at 32 to grip the edges of the perforation. In order that the nut may be rotatable, it is preferable to insert a washer 33 between the diaphragm and the spun over end of the nut body.

The valve 17 and its associated parts above described are so constructed that the axis of the trunnions 19, on which the valve pivots, lies at one side, the right side, as viewed in Fig. 1, of the vertical axis of the device, i. e. the axis of the vertical tube 5 and of the diaphragm 16; and the axis of the pin 23 lies at the other side of said vertical axis. At the left of the trunnions 19 the valve, when in the closed position shown in solid lines, preferably overlaps or abuts upon the upper end or edge of the tubular portion 5, and at the right of the trunnions 19, the elliptical periphery of the valve 17 when in the closed position comes into valve closing contact with the inner wall of the tubular portion 5, and by adjustably rotating the nut 28, the connecting rod 26 may be raised or lowered to cause the valve to be tightly closed as just described when the dished diaphragm is in its downward or solid line position.

The solid line position of the diaphragm as illustrated is the position which it takes up at relatively low temperatures due to its dished shape. In this position, when the adjusting nut is screwed up on the connecting rod, the diaphragm exerts a resilient force on the valve to hold it closed, as just described.

If the diaphragm were not connected to the valve and if, therefore, its action were not influenced by the water pressure in a manner to be described, the diaphragm would, upon a rising temperature, move from its solid line position toward its dotted line position and at a critical point in its movement would snap to the dotted line position; and on falling temperature would return in a similar manner to the solid line position. As employed in my valve device, however, the pressure of the fluid being controlled modifies this normal snap action tendency of the diaphragm as will presently be described.

The movement of the diaphragm 16, toward its dotted line position, is accompanied by movement of the valve 17 toward its dotted line or open valve position, due to the connection between the two by the connecting rod 26. By locating the valve pivot and connecting rod close together, only a small movement of the diaphragm is required for movement of the valve. As a convenient stop to limit the opening movement of the valve 17, the connecting rod 26 may be formed with a loop, as shown at 35.

When the valve device is applied to the water circulating system of an internal combustion engine, which is one of the preferred applications of my invention, and the water is circulated under pressure by means of the usual pump, not shown, the water flows through the device when the valve is in the open position and thence to the automobile radiator and is cooled therein; and when the valve closes the flow through the radiator is discontinued. The water thus exerts pressure on the valve, which is maximum when the valve is closed and which diminishes when the valve opens, because in its open positions, the valve lies in a direction of the flow and because the pressure itself is less when the water is freely flowing.

By positioning the axis of the trunnions 19 at one side of the tubular axis, as described, the area of the valve at the left of the valve axis and exposed to the water pressure set up by the pump is greater than the area at the right of the valve axis, so that the water pressure tends to move the valve to open it or if open to open it farther. This opening pressure opposes the force of the thermostatic element which tends to hold the valve closed. This off-set positional relation with respect to the axis of the tubular passage way of the valve axis and the pivot connection axis is illustrated in Fig 6, where the valve device is shown with the tubular axis $x$ in a horizontal position and the valve axis $y$ is shown above the axis $x$ and the axis $z$ of the pivot connection is shown below the axis $x$.

In the operation of my valve device, therefore, it will now be apparent that when the temperature of the fluid, for example the cooling water in an internal combustion engine, is below a predetermined value, the thermostatic element will remain in its solid line position and the valve will remain closed. The forces acting on the valve will be the water pressure tending to open it and the opposing force of the thermostatic element tending to hold it closed, the latter force being adjustable by the nut 28. When the temperature of the water rises upon operating the engine, the temperature will reach a value at which the valve closing force of the thermostatic element will begin to diminish and the pressure of the water on the valve tending to open it will equal and counter-balance said force. This is the pre-determined temperature at which the regulation of the device begins. Upon further rise of temperature, the resilient force asserted by the thermostatic element will continue to decrease and the water pressure will then open the valve, and as the said force decreases more and more on further rise of temperature the water pressure will open the valve more and more.

The farther the valve opens the less will be the opening force thereon due to the water pressure because the valve takes up a position more and more in the direction of flow and because due to the flow the pressure itself diminishes. Correspondingly, the force of the thermostatic element diminishes because the element approaches more and more nearly to the position at which it will finally cease to exert any force in the closing direction, i. e. the position at which its tendency would be to snap to the dotted line position. Thus, the opening force of the water pressure and the closing force of the diaphragm tend at all positions to be balanced.

When the valve opens as described, it permits the water to flow through the radiator and to be cooled, thus normally stopping the rise of temperature. If the radiator lowers the water temperature, the force of the thermostatic element will increase and the valve will partially close, thus reducing the rate of flow of water to the radiator and reducing the cooling effect thereby.

Thus the position of the valve is regulated and the flow of water to the radiator is controlled thereby responsive both to the temperature and pressure of the water to maintain or tend to maintain a substantially constant water temperature at a pre-determined high temperature value. This value may be chosen as the efficient operating temperature of the engine.

Thus, when the engine is cold the valve will remain closed permitting the engine to heat up quickly to its efficient operating temperature. Also, after operating if the engine is stopped, thus discontinuing the pressure in the water system, the valve will be held open only by the thermostatic element and therefore will close while the temperature is still high, thus shutting off thermal siphon flow of the water and retaining its heat to keep the engine warm.

In Fig. 2, the dotted line position of the thermostatic element indicates the extreme position to which the diaphragm might move on the occasion of exceedingly high water temperature. In the normal operation of the device, however, the diaphragm does not move to its full position, its movement being from the solid line position shown to approximately a mid position.

In the modified form of my invention shown in Fig. 7, another form of construction of the bi-metallic diaphragm and its mounting is shown. The lower ends of the hangers 44 are reduced at 40 and pass through perforations near the periphery of the bi-metallic diaphragm 41. The ends of the reduced portions are then riveted over as at 42, washers 43 being interposed between the riveted heads and the diaphragm. By providing hangers 44 relatively long and of relatively long cross-section, there will be sufficient flexibility in the frame construction of the device to permit the diaphragm 41 to move back and forth freely to operate as described for the other form.

I claim:

1. In a thermo-responsive valve device for controlling the flow of fluid in a conduit, a tubular valve seat element through which the fluid is directed to flow, a supporting flange on the tubular element, adapted to be sealedly mounted in the joint between two mating elements of the fluid conduit, a valve element mounted to oscillate on an axis transversely of the tubular element to open and close the passage way therethrough, a plurality of diaphragm supporting elements each secured at one end to said flange and extending therefrom in the general direction of the tube axis and secured at their other ends to a diaphragm carrier, a dished-disk bi-metallic diaphragm on the carrier and an axially disposed connecting rod secured at one end to said diaphragm and at the other end pivoted to said valve.

2. In a thermo-responsive valve device for controlling the flow of fluid in a conduit, a tubular valve seat element through which the fluid is directed to flow, a supporting flange on the tubular element, adapted to be sealedly mounted in the joint between two mating elements of the fluid conduit, a valve element mounted to oscillate on an axis transversely of the tubular element to open and close the passage way therethrough, a plurality of diaphragm supporting elements each secured at one end to said flange and extending therefrom in the general direction of the tube axis and secured at their other ends to a diaphragm carrier, said carrier being provided with a U-shaped recess, a dished-disk bi-metallic diaphragm supported in the recess and an axially disposed connecting rod secured at one end to said diaphragm and at the other end pivoted to said valve.

3. In a thermo-responsive valve device for controlling the flow of fluid in a conduit, a tubular valve seat element through which the fluid is directed to flow, a supporting flange on the tubular element, adapted to be sealedly mounted in the joint between two mating elements of the fluid conduit, a valve element mounted to oscillate on an axis transversely of the tubular element to open and close the passage way therethrough, a plurality of diaphragm supporting elements each secured at one end to said flange and extending therefrom in the general direction of the tube axis, a diaphragm carrier comprising a U-shaped recess disposed about the tube axis, a plurality of ears on the carrier to which the other ends of said diaphragm supporting elements are secured, a dished-disk bi-metallic diaphragm mounted in the said recess and an axially disposed connecting rod secured at one end to said diaphragm and at the other end pivoted to said valve.

4. In a thermo-responsive valve device for controlling the flow of fluid in a conduit, a cylindrical tubular valve seat element through which the fluid is directed to flow, an annular supporting flange on the tubular element adapted to be sealedly mounted in the joint between two mating elements of the fluid conduit, a generally elliptical valve element mounted to operate on an axis transversely of the tubular element to open and close the passage way therethrough, a plurality of diaphragm supporting elements each secured at one end to said flange and extending therefrom in the general direction of the tube axis, an annular diaphragm carrier provided with an annular U-shaped recess opened inwardly, ears on the carrier secured to the other ends of said supporting elements, a dished-disk bi-metallic diaphragm supported in the said recess, and an axially disposed connecting rod adjustably secured at one end to said diaphragm and at the other end pivoted to said valve.

5. In a thermo-responsive valve device for controlling the flow of fluid in a conduit, a tubular valve seat element through which the fluid is directed to flow, a supporting flange on the tubular element, adapted to be sealedly mounted in the joint between two mating elements of the fluid conduit, a valve element mounted to oscillate on an axis transversely of the tubular element to open and close the passageway therethrough, a plurality of diaphragm supporting elements each secured at one end to said flange and extending therefrom in the general direction of the tube axis and secured at their other ends to a diaphragm carrier, a dished-disk bi-metallic diaphragm on the carrier and an axially disposed connecting rod secured at one end to said diaphragm and at the other end pivoted to said valve, the axis of said valve element being positioned at one side of the tube axis.

6. In a thermo-responsive valve device for controlling the flow of fluid in a conduit, a tubular valve seat element through which the fluid is directed to flow, a supporting flange on the tubular element, adapted to be sealedly mounted in the joint between two mating elements of the fluid conduit, a valve element mounted to oscillate on an axis transversely of the tubular element to open and close the passageway therethrough, a plurality of diaphragm supporting elements each secured at one end to said flange and extending therefrom in the general direction of the tube axis and secured at their other ends to a diaphragm carrier, a dished-disk bi-metallic diaphragm on the carrier and an axially connecting rod secured at one end to said diaphragm and at the other end having a pivot connection with said valve element, said valve axis being positioned at one side of the tube axis and said pivot connection being positioned on the opposite side of said tube axis.

7. In a thermo-responsive valve device for controlling the flow of fluid in a conduit, a stationary valve element having a passageway through which the fluid may be directed to flow, a supporting flange on the stationary element adapted to be sealedly mounted in the joint between two mating elements of the fluid conduit, a movable valve element mounted for operation on an axis to open and close the passageway through the stationary valve element, a bi-metallic element responsive to temperature conditions of the fluid to be controlled, means connected to said flange for supporting the bi-metallic element and the valve, a connecting element between the bi-metallic element and the valve for transmitting movement to the valve axially of the passageway, said connecting element having a pivotal connection with the movable valve element, the said passageway being formed to have a longitudinal axis of symmetry and the oscillatory axis of said movable valve element being positioned at one side of said axis of symmetry, a connecting element substantially rigidly connected to a central portion of the bi-metallic element, and the bi-metallic element yieldably permitting lateral movement of opposite end portions of the connecting element with oscillations of the movable valve element.

8. In a thermo-responsive valve device for controlling the flow of fluid in a conduit, a stationary valve element having a passageway through which the fluid is directed to flow, a supporting flange on the stationary element adapted to be sealedly mounted in the joint between two mating elements of the fluid conduit, a movable valve element mounted for operation on an axis to open and close the passageway through the stationary valve element, a bi-metallic element responsive to temperature conditions of the fluid to be controlled, means connected to said flange for supporting the bi-metallic element, a connecting element between the bi-metallic element and the valve, for transmitting movement to the valve axially of the passageway, said connecting element having a pivotal connection with the movable valve element, the said passageway being formed to have a longitudinal axis of symmetry and the oscillatory axis of said movable valve element being positioned at one side of said axis of symmetry, and said pivotal connection being positioned on the opposite side of said axis, a connecting element substantially rigidly connected to a central portion of the bi-metallic element, and the bi-metallic element yieldably permitting lateral movement of opposite end portions of the connecting element with oscillations of the movable valve element.

9. In a thermo-responsive valve device for controlling the flow of fluid in a conduit, a stationary valve element having a tubular passageway through which the fluid is directed to flow, a supporting flange on the stationary element adapted to be sealedly mounted in the joint between two mating elements of the fluid conduit, a movable valve element mounted for operation on an axis to open and close the tubular passageway through the stationary valve element and to close it by overlapping engagement with axially end terminations thereof, a bi-metallic element responsive to temperature conditions of the fluid to be controlled, means connected to said flange for supporting the bi-metallic element, a connecting element between the bi-metallic element and the valve for transmitting movement to the valve, axially of the passageway.

10. In a thermo-responsive valve device for controlling the flow of fluid in a conduit, a stationary valve element having a passageway through which the fluid is directed to flow, a supporting flange on the stationary element adapted to be sealedly mounted in the joint between two mating elements of the fluid conduit, a movable valve element mounted for operation on an axis to open and close the passageway through the stationary valve element, a bi-metallic element responsive to temperature conditions of the fluid to be controlled, means connected to said flange for supporting the bi-metallic element, a connecting element between the bi-metallic element and the valve for transmitting movement to the valve, axially of the passageway, said connecting element being screw threadedly connected to the bi-metallic element to adjust its effective length and loosely pivotally non-rotatably connected to the valve to prevent accidental change of adjusted length.

11. In a thermo-responsive valve device for controlling the flow of fluid in a conduit, a stationary valve element having a passageway through which the fluid is directed to flow, a supporting flange on the stationary element adapted to be sealedly mounted in a joint between two mating elements of the fluid conduit, a movable valve element mounted for pivotable operation on an axis to open and close the passageway through the stationary valve element, a bi-metallic element responsive to temperature conditions of the fluid to be controlled, means connected with said flange and supporting the bi-metallic element, an axially extending connecting element between the bi-metallic element and the valve, said connecting element being provided with a laterally extending projection to be engaged by the valve element in a predetermined open position thereof corresponding to a predetermined maximum permissible warping valve opening movement of the bi-metallic element.

12. In a thermo-responsive valve device for controlling the flow of fluid in a conduit, a stationary valve element having a tubular passageway through which the fluid may be directed to flow, a movable valve element mounted for operation on an axis to open the tubular passageway through the stationary valve element and to close it by overlapping engagement with axial end terminations thereof, a bi-metallic element responsive to temperature conditions of the fluid to be controlled, a connecting element between the bi-metallic element and the valve element for transmitting movement to the valve element axially of the passageway.

13. In a thermo-responsive valve device for controlling the flow of fluid in a conduit, a stationary valve element having a tubular passageway through which the fluid may be directed to flow, a movable valve element mounted for operation on an axis to open the tubular passageway through the stationary valve element and to close it by overlapping engagement with axial end terminations thereof, a bi-metallic element responsive to temperature conditions of the fluid to be controlled, a connecting element between the bi-metallic element and the valve element for transmitting movement to the valve element.

14. In a thermo-responsive valve device for controlling the flow of fluid in a conduit, a stationary valve element having a passageway through which the fluid may be directed to flow, a valve element mounted for oscillation on an axis to open and close the passageway through the stationary valve element, a bi-metallic element responsive to temperature conditions of the fluid to be controlled, a connecting element between the bi-metallic element and the valve element for transmitting movement to the valve element, the connecting element having a pivotal connection with the valve element and substantially rigidly connected to the bi-metallic element, and the bi-metallic element yieldably permitting lateral movements of the connecting element at portions relatively remote from the bi-metallic element corresponding to oscillatory movements of the valve element.

15. In a thermo-responsive valve device for controlling the flow of fluid in a conduit, a stationary valve element having a passageway through which the fluid may be directed to flow, a valve element mounted for oscillatory movement on an axis to open and close the passageway through the stationary valve element, a bi-metallic disc form element responsive to temperature conditions of the fluid to be controlled, a connecting element between a central portion of the bi-metallic element and the valve element for transmitting movement to the valve element, the connecting element being substantially rigidly connected at one end portion to a central portion of the bi-metallic element and the bi-metallic element yieldable to permit lateral movements of opposite end portions of the connecting element with oscillatory movements of the valve element.

16. In a thermo-responsive valve device for controlling the flow of fluid in a conduit, a stationary valve element having a passageway through which the fluid is directed to flow, a supporting flange on the stationary element adapted to be sealedly mounted in a joint between two mating elements of the fluid conduit, a movable valve element mounted for oscillatable operation to open and close the passageway through the stationary valve element, a thermostatic element responsive to temperature conditions of the fluid to be controlled, means connected with said flange and supporting the thermostatic element, an axially extending connecting element between the thermostatic element and the valve, said connecting element being provided with a laterally extending projection to be engaged by the valve element in a predetermined open position thereof corresponding to a predetermined maximum permissible valve opening movement of the thermostatic element.

17. In a thermo-responsive valve device for controlling the flow of fluid in a conduit, a stationary valve element having a tubular passageway through which the fluid may be directed to flow, a swinging valve element mounted for operation to open the tubular passageway through the stationary valve element and to close it by overlapping engagement with an axially presented abutment thereof, a thermostatic element responsive to temperature conditions of the fluid to be controlled, a connecting element between the thermostatic element and the valve element for transmitting movement to the valve element axially of the passageway.

18. In a thermo-responsive valve device for controlling the flow of fluid in a conduit, a stationary valve element having a tubular passageway through which the fluid may be directed to flow, a swinging valve element mounted for operation to open the tubular passageway through the stationary valve element and to close it by overlapping engagement with an axially presented abutment thereof, a thermostatic element responsive to temperature conditions of the fluid to be controlled, a connecting element between the thermostatic element and the valve element for transmitting movement to the valve element.

19. In a thermo-responsive valve device for controlling the flow of fluid in a conduit, a stationary valve element having a passageway through which the fluid may be directed to flow, a valve element mounted for oscillatory movement to open and close the passageway through the stationary valve element, a thermostatic element of substantially flattened form responsive to temperature conditions of the fluid to be controlled, a connecting element between a central portion of the thermostatic element and the valve element for transmitting movement to the valve element, the connecting element being substantially rigidly connected at one end portion to a central portion of the thermostatic element and the thermostatic element yieldable to permit lateral movements of opposite end portions of the connecting element with oscillatory movements of the valve element.

EDWARD J. LEVY.